United States Patent
Listou

(10) Patent No.: US 6,216,139 B1
(45) Date of Patent: Apr. 10, 2001

(54) INTEGRATED DIALOG BOX FOR RAPIDLY ALTERING PRESENTATION OF PARAMETRIC TEXT DATA OBJECTS ON A COMPUTER DISPLAY

(75) Inventor: Robert Listou, Washington, DC (US)

(73) Assignee: Execware, Washington, DC (US)

( * ) Notice: Subject to any disclaimer, the term of this patent is extended or adjusted under 35 U.S.C. 154(b) by 650 days.

(21) Appl. No.: 08/561,178

(22) Filed: Nov. 20, 1995

(51) Int. Cl.$^7$ .................................................. G06F 17/24
(52) U.S. Cl. .......................... 707/505; 707/503; 707/508
(58) Field of Search .................... 395/764, 766, 395/769, 770, 604, 610, 603, 613, 340, 347, 348, 352; 364/146, 188; 707/503, 505, 508, 509, 4, 3, 10, 103, 102; 345/340, 347, 348, 352

(56) References Cited

U.S. PATENT DOCUMENTS

| | | | |
|---|---|---|---|
| 5,396,621 | | 3/1995 | MacGregor et al. ................. 395/347 |
| 5,428,776 | * | 6/1995 | Rothfield .............................. 395/604 |
| 5,566,330 | * | 10/1996 | Sheffield ............................... 395/604 |
| 5,584,024 | * | 12/1996 | Shwartz ............................... 395/604 |
| 5,619,688 | * | 4/1997 | Bosworth et al. .................... 395/604 |

OTHER PUBLICATIONS

Declaration of Robert Listou, Sep. 3, 1996.
Peter G. Aitken, WordPerfect for Windows Fast, p. 187 (1992).
1–2–3– Quickstart, The Step–By–Step Approach (2d ed.), pp. 397, 400–406 (1990).
Microsoft® Project for Windows Feature Guide, Version 1.0, Microsoft Corporation, 1990, pp. V, 21–33, 48–57, 85–95, 110, 111 and 133.*

* cited by examiner

Primary Examiner—Stephen S. Hong
(74) Attorney, Agent, or Firm—Covington & Burling

(57) ABSTRACT

An apparatus, method and article of manufacture of the present invention provide the ability to rapidly format and reformat tabular displays of records or text data objects organized according to the preferences of the user. The invention provides simplified, interactive means for naming categories or parameters associated with each text data object, for assigning values to each parameter for each text data object, and for constructing a sort order for displaying the text data objects. The features of the present invention allow a user, without need for specialized training or a user manual, rapidly to view the same or different sets of text data objects from differing perspectives, without cumbersome steps that could interrupt the user's line of thought.

19 Claims, 15 Drawing Sheets

516

| Viewing Link | | | |
|---|---|---|---|
| Note | | | Ok |

Issue: Reorganization
Action: IRM Plan (Draft)
Type: DR
Assigned To: Bellows
Assigned On: 03/16/96
Due On: 10/05/96
Completed: / /

Links (Issue / Action)
Links Depend On
1. Project A / Marketing Plan
2.
3.

Description [Expand]

| | Adding I-TRAC Data | | | |
|---|---|---|---|---|
| Note | | Print | Save | Cancel |

Issue [▼]  Action [____]  Type [▼]   → 702

Assigned To [░░▼]  Assigned On [11/13/95] 📅  Due On [ / / ] 📅  Completed [ / / ] 📅

Links (Issue / Action)

1. [_____▼]
2. [_____▼]
3. [_____▼]

Description [Expand]

INTEGRATED DIALOG BOX FOR RAPIDLY ALTERING PRESENTATION OF PARAMETRIC TEXT DATA OBJECTS ON A COMPUTER DISPLAY

BACKGROUND OF THE INVENTION

This invention relates generally to the field of information processing and display by computers and, more particularly, to a computer-implemented method for sorting and displaying text data objects that permits rapid re-sorting and re-formatting of displayed text data objects.

DESCRIPTION OF THE RELEVANT ART

Database management systems today generally provide for the creation, storage, and display of large quantities of both numeric and text data. For example, a company may maintain a database of employee payroll records. In such a database, a series of payroll checks to Jane Doe may be stored as a large number of records, all with identical data elements or parameters such as name, employee number, address, Social Security Account Number, gross pay, along with a unique date. An operator of the database can design tables that display selected records as rows with the data parameters arranged in a particular desired order. Mathematical operations can typically be performed on columns containing numeric data. However, the relationships between and among the data parameters of such a table may not be readily apparent. Typically, the purpose for reviewing such a table is to ascertain that all desired records are listed and that each record appears complete.

In the existing art, tabular displays of records can be designed as desired. However, if examination of a table suggests a change in a record or consideration of a different table format, the user must usually interrupt his or her current line of thought. Tabular data displays are seldom designed by those who will employ them for drawing conclusions, and seldom does the user of a table have ready ability to manipulate the database in order to reformat or rearrange the table. If a record needs to be changed or a new table format is desired, it may take considerable time to produce a table reflecting the changes. Even if the user is the operator of the database management system, time will be required and the user's current line of analytic reasoning may be lost.

Existing electronic spreadsheet programs, such as Lotus 1-2-3™ and Microsoft EXCEL™, can also involve text and numeric data arranged in tabular form. Typically, each row in a table concerns a unique subject, and the cells making up the row contain textual or numerical data setting forth parameters or characteristics of the subject. For example, a row might represent a record concerning a particular city, and the cells would include text and numeric data that can be used in computations such as population, area or number of schools. Formulas can be entered into cells of the spreadsheet so that data pertaining to individual rows can be aggregated or otherwise manipulated. For instance, in a table listing population data for cities, a spreadsheet typically could provide a total of the population figures for selected cities. Current art also enables the operators of some spreadsheets to create three-dimensional graphs of numbers displayed in the spreadsheet, with each axis of the graph representing one of the parameters listed in the same row as the numbers. If there are more than three parameters, the operator can create several graphs with varying dimensions. Analysis of several such graphs can disclose relationships that cannot be perceived by looking at a single graph. The operator can usually, upon viewing a spreadsheet, relocate columns and rows. The operator cannot, however, easily and quickly revise the contents of a row; and spreadsheets typically do not have the capability to search for records rapidly.

Thus, while computer database management systems and spreadsheet programs with data-sorting capability have been widely available, existing systems and programs for sorting data may not adequately serve the needs of some users, especially those without specialized training or experience attempting quickly to discern relationships between and among elements in large sets of data. Existing programs typically focus on presenting the data, rather than on providing the ability rapidly to draw conclusions from the data. Frequently, in existing programs, it is not possible to select different sort parameters and differing subsets of the data without a series of precisely-specified steps that can frustrate a user interested in quickly pursuing many varying lines of thought. Often, operation of such programs requires substantial training, familiarity with user manuals and, in some cases, specialized personnel.

The present invention derives from the observation that individuals who must draw conclusions from tables of text data objects have needs not met by currently-available database management systems and spreadsheet programs. An individual's analysis occurs in the context of the broader range of knowledge and experience that he or she brings to the situation. Accordingly, this analysis will be enhanced by exercising personal control of the format of the presentation of text data objects. Users of databases need more than the ability to influence the design of the tables; they need the ability to relate interactively with the tables to quickly revise the format to match the rapid and complex probing of the thought process. In particular, users of databases need interactive capabilities (1) to change parameter values of individual text data objects contained in a table and immediately to see how that change affects the location of text data objects in the table; (2) to add or delete text data objects and immediately to see the results; and (3) to reformat tables displaying text data objects. Because these capabilities enable users quickly to perceive relationships between objects in several ways, analysis of individual text data objects as well as entire databases of text data objects can be enhanced. Perceiving those relationships rapidly, and in the context of other data and analytic intentions in the user's mind (including those generated intuitively during the processing) is called contextual data modeling.

OBJECTS AND SUMMARY OF INVENTION

The present invention permits the use of a computer system rapidly to reformat displays of text data objects in terms of parameters chosen by the user, without the aid of an instruction manual and without extensive computer training. In this invention, a text data object is an item, such as a text record, to which parameters have been associated. One object of the present invention is to permit a user of a computer system equipped with an appropriate display device rapidly to switch from viewing a table of text data objects (e.g., action or project) sorted according to one or more parameters (e.g., date due) to viewing a table of the same text data objects sorted according to a different set of parameters (e.g., personnel assigned). Alternatively the user may choose to view different subsets of a set of text data objects. The invention allows the user, within seconds, to format and re-format displays of the same text data objects from several differing perspectives.

Another object of the present invention is to permit a user of a computer system to sort and display text data objects in terms of an ordering of parameters chosen by the user, and to permit the user rapidly to sort and display the same or different sets of text data objects according to the same or different parameters or the same or different orders of parameters.

Another object of the invention is to provide a simplified method for a user to select text data objects to be sorted and for choosing the format of a table for displaying the sorted text data objects.

According to the present invention, as embodied and broadly described herein, a method for using a computer system to sort and display text data objects is provided. According to the method, a Query dialog box appears on a computer controlled display device, such as a monitor. The Query dialog box displays each of a plurality of parameters that have previously been named by the user and associated with text data objects, and provides a space under each displayed parameter. The space under each parameter displayed in the Query dialog box permits the user to view the possible values for that parameter held by text data objects, and to assign to that parameter a value. The Query dialog box also displays a list of parameters and prompts the user to construct a sort order from that list of parameters. According to the present invention, the user selects values for each parameter in the spaces provided and constructs a sort order. The computer system then selects the text data objects satisfying the values assigned to the displayed parameters, sorts the selected text data objects according to the constructed sort order, and displays the sorted text data objects on a suitable display device.

Further according to the present invention, a user viewing a display of text data objects may quickly return to the Query dialog box in order to change the values of the parameters of the text data objects to be selected and/or to modify the construction of the sort order for the selected text data objects.

Also, according to the present invention, a computer system comprising means for effectuating the method of the present invention is provided. Further according to the present invention, computer-readable memory encoded with a program directing a computer system to effectuate the method of the present invention is also provided.

Additional objects and advantages of the invention are set forth in part in the description that follows, and in part are obvious from the description, or may be learned by practice of the invention. The objects and advantages of the invention may also be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate particular embodiments of the invention, and together with the description, serve to explain the principles of the invention.

FIG. 3(a) is an illustration of a display screen showing an exemplary pull-down menu in a Query dialog box that permits the user to assign a value to a parameter.

FIG. 4(a) is an illustration of a display screen showing the table that would be produced according to the present invention in response to the query and sort order shown in FIG. 3(b).

FIG. 5(a) is an illustration of a display screen showing an exemplary Viewing Link dialog box that can be accessed from an edit dialog box by a user wishing to view information about text data objects that depend on a text data object being edited.

FIG. 7 is an illustration of a display screen showing an Add dialog box for creating a new text data object.

DETAILED DESCRIPTION OF THE PREFERRED EMBODIMENTS

Figure 1:
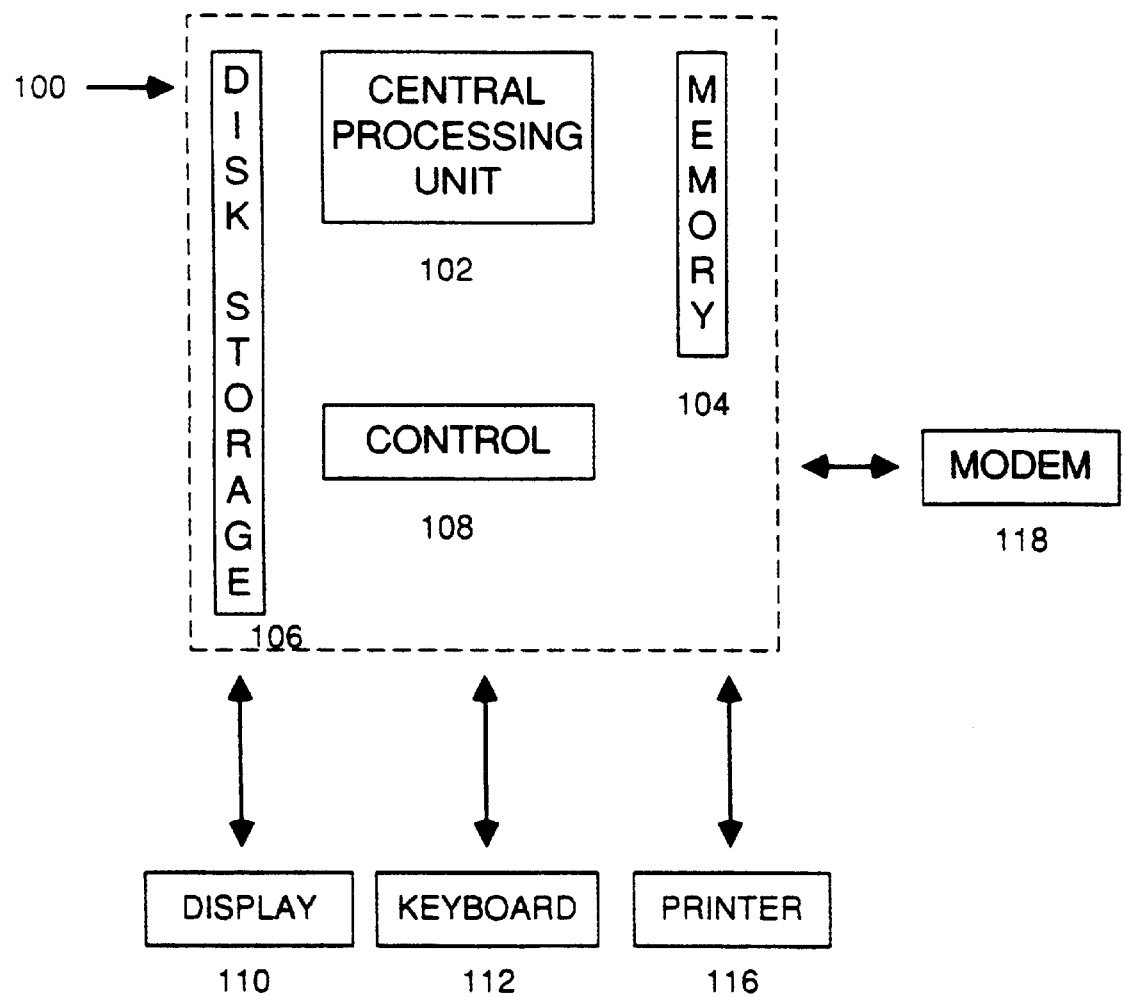
FIG. 1 is a block diagram of a computer system as may be utilized by the present invention.

A computer system as may implement and execute the present invention is described with reference to FIG. 1. Such a computer system generally may comprise a processing means (102), such as a central processing unit (CPU), for processing information; a memory (104) for storing information and instructions for the processor, preferably including a dynamic storage means (such as random access memory (RAM)) and a static storage means (such as read-only memory (ROM)); a data storage device (106) such as a magnetic disk and disk drive for storing information and instructions; a control means (108) for controlling input/output operations and the interaction between the processor (102) and the memory; a display device (110) such as a cathode ray tube or liquid crystal display for displaying a cursor and information to the computer user; an alphanumeric input device (112), such as a keyboard, including alphanumeric and other keys for communicating information and command selections to the processor (102); and a cursor control device (114), such as a point-and-click mouse device, trackball, joystick, or light pen, for communicating information and command selections to the processor (102) and for controlling cursor movement. It is useful if the system includes a hardcopy device (116), such as a printer, for providing permanent copies of information. Finally, the system may include a modem (118) for communicating with computer systems at remote locations.

Figure 2:
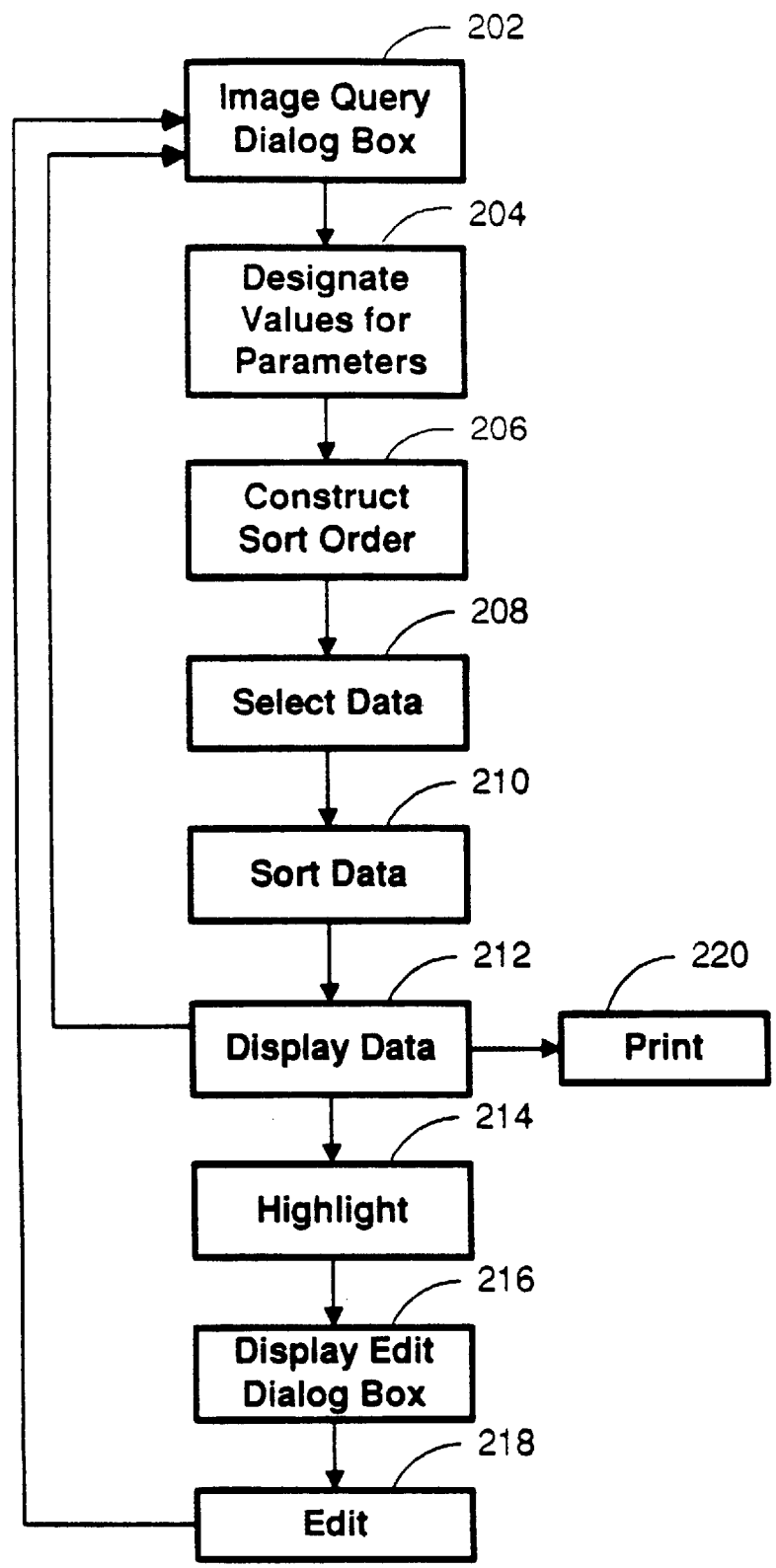
FIG. 2 is a flow diagram showing the overall operation of the present invention.

FIG. 2 is a flow diagram depicting the overall operation of the invention. While the invention can be practiced in a manner different from that depicted in the flow diagram, the flow diagram provides a useful overview for understanding the invention.

The invention involves, among other things, the use of a computer system, such as depicted in FIG. 1, to sort and display text data objects stored in the computer system. As shown in FIG. 2, the invention comprises the steps of imaging a Query dialog box on a display device controlled by the computer system, with the Query dialog box displaying parameters associated with each of the text data objects, spaces for listing the values associated with each parameter and a list of parameters for selecting a sort order (202); designating at least one value listed in the Query dialog box for each of the parameters displayed in the Query dialog box (204); constructing a sort order from a list of parameters displayed in the Query dialog box (206); using the computer system to select the text data objects satisfying the designated values (208); and using the computer system to sort the selected text data objects satisfying the designated values (210). In a preferred embodiment, the computer system is equipped with Windows™ software and suitable display and point-and-click mouse devices well known in the art to enable a user to signal the computer system using the point-and-click mouse device.

Figure 3:
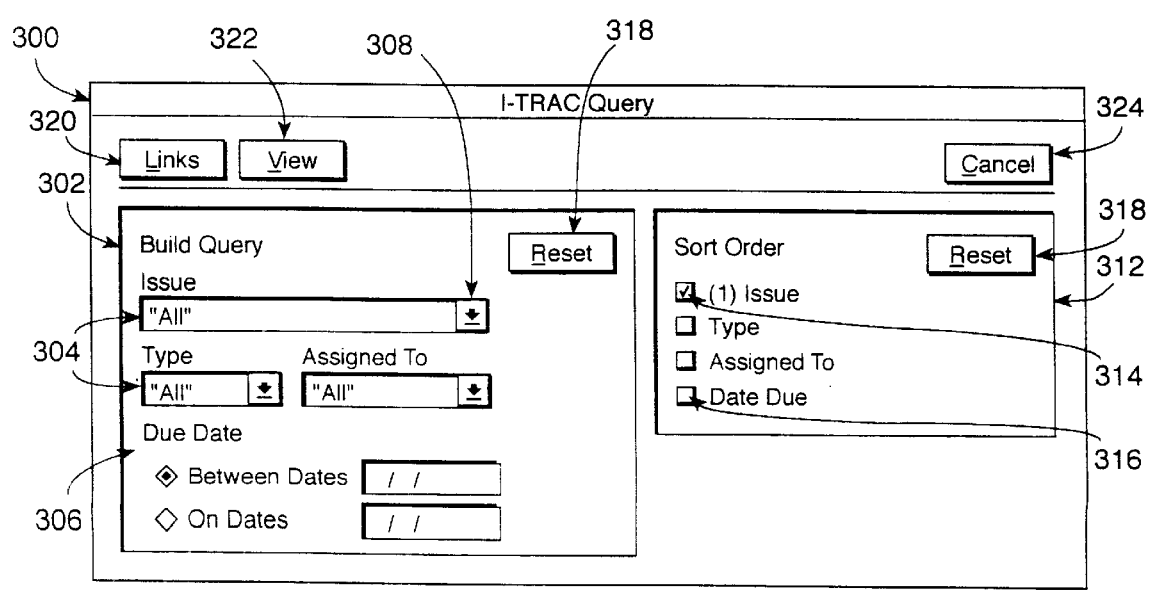
FIG. 3 is an illustration of a display screen showing an exemplary Query dialog box for assigning values to parameters and choosing a sort order.
Figure 3:
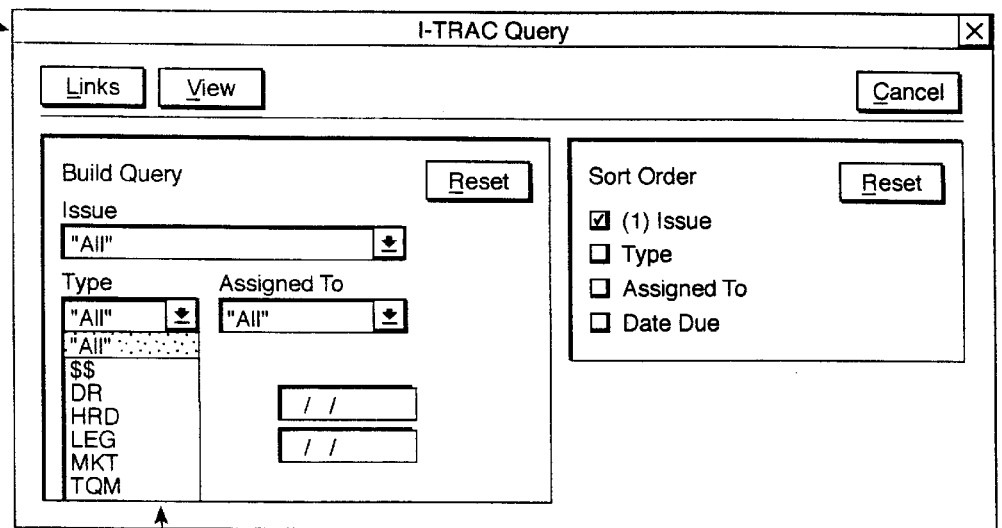

The step of Image Query Dialog Box (202) in FIG. 2 preferably is accomplished by a user of the computer system signalling the system through the use of a point-and-click device, such as a mouse. In a preferred embodiment, an exemplary Query dialog box imaged on the computer-controlled display is shown in FIG. 3. The steps required to program a computer system to accept suitable signalling and to display the Query dialog box (300) depicted in FIG. 3 are well known to one of ordinary skill in programming for Windows198 applications.

FIG. 3 is a depiction of an exemplary Query dialog box used for constructing a query. In a preferred embodiment, the left-hand side of the Query dialog box displays a Build Query dialog box (302) that displays a plurality of parameters and prompts the user to enter values for each displayed parameter in a space (304) below that parameter. In the illustration of a preferred embodiment depicted in FIG. 3, the space below each parameter displays the word "All" as the value for each parameter other than the parameters in the Date Due dialog box (306) within the Build Query dialog box (302). In a preferred embodiment, "All" is the default value for each parameter, such that "All" appears in the space below each parameter for the first Query of a session, or after parameter values are reset. When "All" is accepted as the value for a parameter, using a point-and-click or similar mechanism, the computer will select for sorting all text data objects that satisfy the values assigned to each of the other parameters. When a value other than "All" is selected for a parameter (as described below), the computer system will select for sorting only those text data objects meeting that assigned value for that parameter as well as the assigned values for each of the other parameters.

In a preferred embodiment, the space below a displayed parameter in the Query dialog box also provides means, using a point-and-click or similar mechanism, for the user to view all of the values that may be assigned to that parameter. To the right of each space below each parameter, an icon labeled with a down-arrow (308) preferably is displayed. In a preferred embodiment, clicking on such a down-arrow icon with the mouse signals the computer system to display a pull-down menu with all the values that may be assigned to the particular parameter. In FIG. 3(a), the pull-down menu (310) preferably also permits the user to select as a value for the parameter none, all, or any subset of the listed values that may be assigned to the particular parameter. In a preferred embodiment, if the user makes no selection for the value of a particular parameter, the value "All" is automatically selected if the parameter is non-temporal (e.g., Issue, Type, Assigned To), and no value is selected if the parameter is temporal (e.g., Between Dates, On Date). In a preferred embodiment, if a desired value for a parameter is not listed in a pull-down menu of values for that parameter, the user may assign that desired value to that parameter by typing that desired value into the space below the parameter. In an alternative preferred embodiment, the user has the ability to designate parameters that can only be assigned values from the pull-down menu listing.

As shown in FIG. 2, another step in the invention is Construct Sort Order (206). In a preferred embodiment, the Query dialog box (300) also includes a Sort Order dialog box (312) displaying a list of parameters for constructing a sort order. A sort order is constructed by assigning a priority number to each of the parameters displayed in the Sort Order dialog box (312). In a preferred embodiment, this is accomplished by using a mouse to click on the box adjacent to an identified parameter in the order according to which the text data objects are to be sorted. In the Query dialog box depicted in FIG. 3, for example, only the box adjacent to parameter "Issue" has been clicked. The check mark (314) in that box indicates that the parameter "Issue" will be used as a sort order criterion. If the text data objects were to be sorted by the parameter "Date Due" after being sorted by the parameter "Issue," the box adjacent to "Date Due" (316) would be clicked, and a check mark would be displayed in that box (316) indicating that "Date Due" would also be used as a sort order parameter. In addition, the designation "(2)" would appear to the immediate left of "Date Due" to indicate that "Date Due" was the second parameter in the sort order. In a preferred embodiment, in order to remove a parameter as a sort-order criterion, the box displaying a check mark next to the name of that parameter displayed in the Sort Order dialog box would again be clicked; the check mark in the box would disappear, as would the parenthetical to the right of the box indicating the position of the parameter in the sort order; and any parentheticals displayed in association with other listed parameters would be automatically updated. In a preferred embodiment, the Sort Order dialog box (312) in the Query dialog box (300) is initially displayed with the box adjacent to the first-listed parameter checked (314), and with no checks in any other boxes adjacent to listed parameters. The sort order represented by this initial display is used to sort text data objects unless the user changes the sort order as indicated above.

In a preferred embodiment, both the Build Query dialog box (302) and the Sort Order dialog box (312) contain boxes labeled "Reset" (318). Clicking on the Reset box in the Build Query dialog box (302) resets the assigned values of the parameters to their initially displayed values, as in a preferred embodiment depicted in FIG. 3. Clicking on the Reset box in the Sort Order dialog box (312) resets the sort order to the initially displayed sort order.

Figure 8:
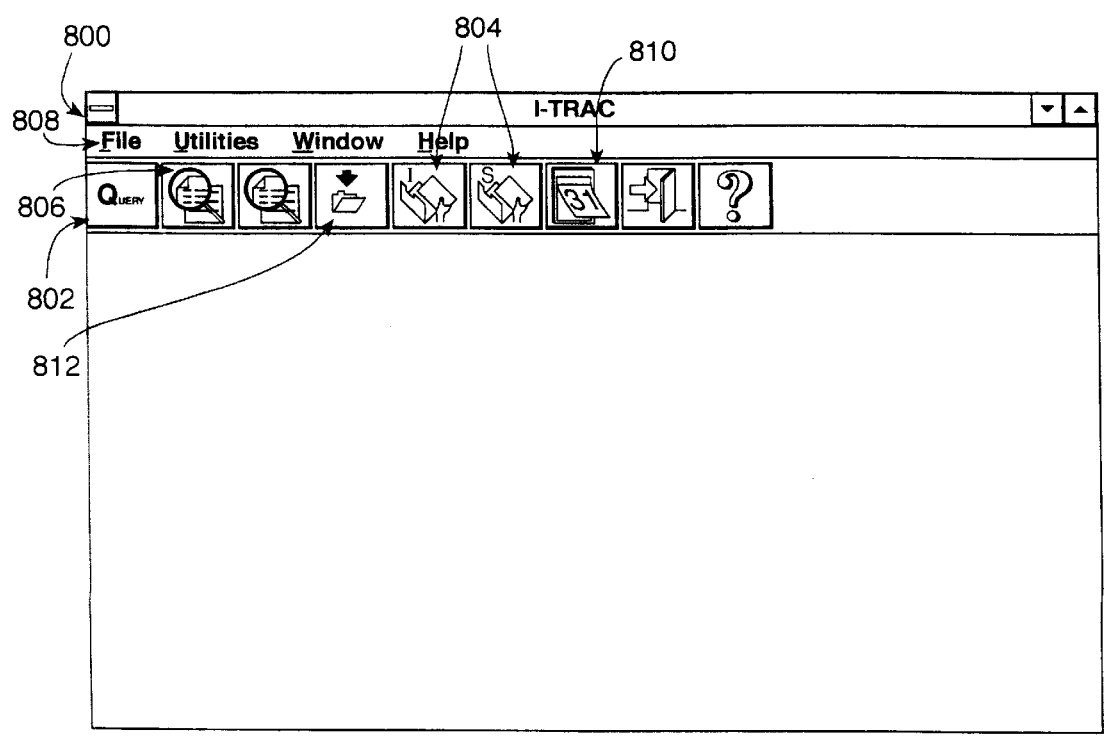
FIG. 8 is an illustration of a display screen that appears when a user of an exemplary embodiment of the present invention starts to use a computer system programmed to implement an exemplary embodiment.

In a preferred embodiment, the Query dialog box (300) includes a menu bar displaying boxes labelled "Links" (320), "View" (322) and "Cancel" (324). Clicking the Cancel box signals the computer system to remove the Query dialog box (300) display and instead to display the screen that first appears when the user enters the program (800), as illustrated in FIG. 8.

Figure 3B:
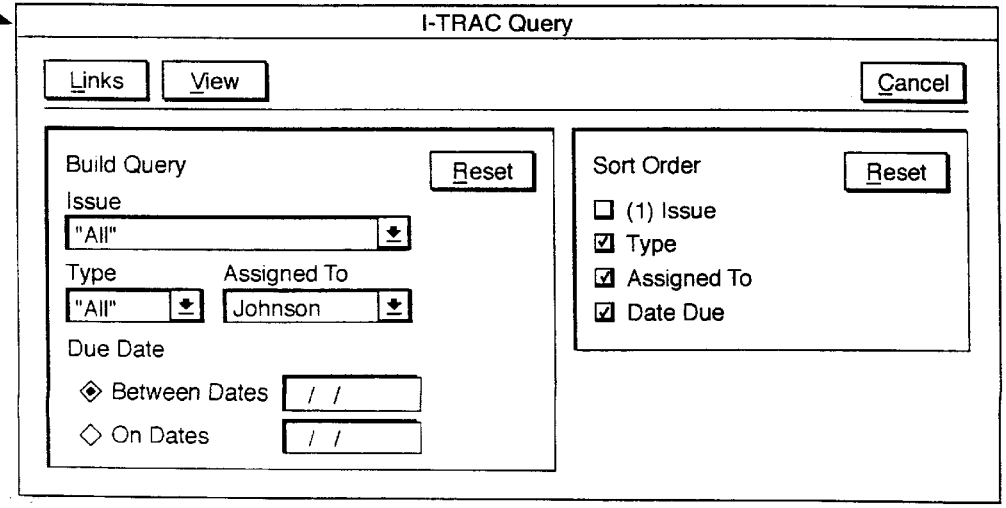
FIG. 3(b) is an illustration of a display screen showing the Query dialog box of FIG. 3 with specific values for parameters selected and a sort order constructed.

FIG. 3(b) is an example of a query and sort order that instructs the computer to select all text data objects with any value (i.e., "All") assigned to the parameters "Issue," and "Type" and with the value "Johnson" assigned to the parameter "Assigned To," and then to sort those selected text data objects in the order (1) "Assigned To," (2) "Date Due," (3) "Type." The resulting display of the selected and sorted text data objects is depicted in FIG. 4(a).

As further shown in FIG. 2, after the Designate Values for Parameters step (204) and the Construct Sort Order step (206) are completed, the computer system selects the text data objects that satisfy the values of the parameters specified in the query. In a preferred embodiment, the mouse is used to click on the View box (322) in the Query dialog box (300) to signal the computer to select the text data objects that satisfy the parameter values designated in the Build Query dialog box (302). In a preferred embodiment, clicking the "View" box (322) in the Query dialog box (300) also signals the computer system to execute the Sort Data step (210), as well as the Display Data step (212) shown on FIG. 2, as described below.

In the Sort Data step (210) depicted in FIG. 2, the text data objects selected in the Select Data step (208) are sorted by the computer system according to the sort order constructed in the Construct Sort Order step (206). After this sorting step, the sorted text data objects are displayed in the Display Data step (212). In a preferred embodiment illustrated in FIG. 4, the Viewing Query screen (400) accomplishes the Display Data step (212) by displaying the selected text data objects in accordance with the sort order established in the Construct Sort Order step (206).

Figure 4:
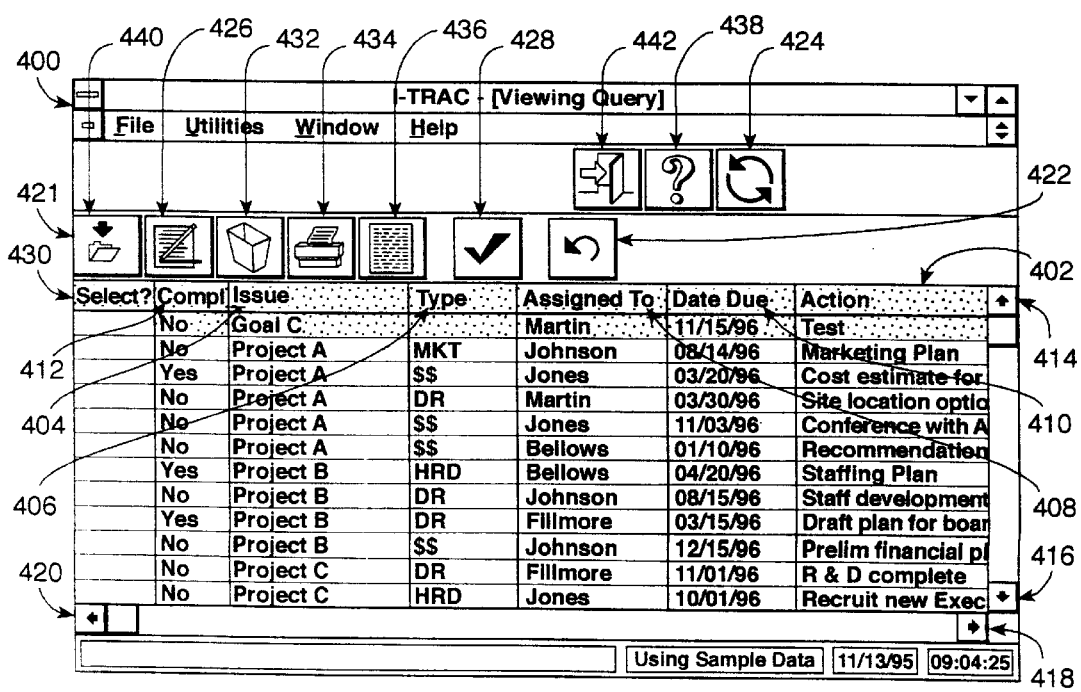
FIG. 4 is an illustration of a display screen showing an exemplary table as may be displayed and used in an illustrative embodiment.
Figure 4:
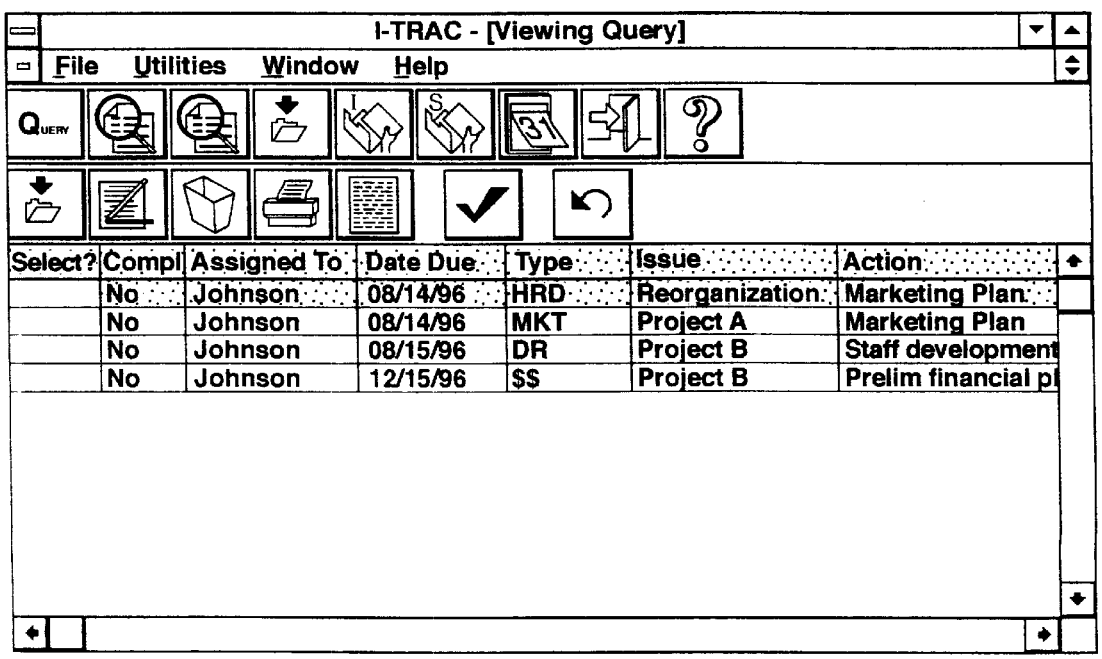

FIG. 4 displays illustrative text data objects selected and sorted according to the parameters, values and sort order shown in the exemplary Query dialog box (300) depicted in FIG. 3. FIG. 4(a) displays illustrative text data objects selected and sorted according to the parameters, values and sort order shown in the alternate exemplary Query dialog box (326) depicted in FIG. 3(b). In these illustrative embodiments, the text data objects are displayed in tabular form, with the parameter names forming column headings and each text data object occupying a row of a table. For each displayed text data object, the value of each parameter associated with that text data object appears in the row occupied by that text data object, under the column heading labelled with the name of that parameter. In the illustrative embodiment depicted in FIG. 4, the text data objects are listed by their textual identifiers in the column labelled "Action" (402). As indicated by the illustrative Sort Order dialog box (312) shown on FIG. 3, the listed text data objects shown in FIG. 4 have been sorted by the parameter "Issue" in alphabetical order of the values of that parameter, and have not been sorted according to any other parameter. A preferred embodiment, includes the ability to display the results of mathematical operations, such as summing or averaging, on numerical data within particular columns. Preferably, the mathematical operation or operations to be performed are specified in the Query dialog box (300) and the results would be displayed in a row at the bottom of the Viewing Query screen (400).

In a preferred embodiment shown in FIG. 4, the columns labeled "Issue" (404), "Type" (406), "Assigned To" (408), and "Date Due" (410) correspond to the parameters displayed in the illustrative Query dialog box of FIG. 3. In a preferred embodiment, these columns appear on the Viewing Query screen from left to right in the order constructed in the Sort Order dialog box (312). The "Compl" column (412) in the illustrative Viewing Query screen of FIG. 4 identifies another parameter whose value indicates whether the project has been completed or not. In a preferred embodiment, values for the "Compl" parameter are entered in the Editing Data dialog box (500) or the Adding Data dialog box (700), discussed below.

In a preferred embodiment, the Viewing Query screen (400) includes an up arrow tab (414), a down arrow tab (416), a right arrow tab (418), and a left arrow tab (420), each located at a corner of the displayed table. Clicking on the up arrow tab or the down arrow tab preferably allows the user to scroll up or down a displayed table, respectively. Clicking on the left arrow tab or the right arrow tab preferably allows the user to remove the left-most or the right-most column of the Viewing Query screen from the field of view, respectively.

In a preferred embodiment, the "Viewing Query" screen (400) includes a menu bar comprising a set of icons (421) across the top of the screen. A preferred embodiment includes a "Return" icon (422) depicting an arrow bent 180 degrees. Clicking on this Return icon signals the computer system to return to the previously displayed screen; when this icon appears on the Viewing Query screen depicted in FIG. 4 (400), the previous screen is the Query dialog box illustrated in FIG. 3 (300). In a preferred embodiment, clicking on this Return icon (422) signals the computer system to display a Query dialog box (300) with the same parameter values and sort order that produced the particular table of text data objects displayed in the Viewing Query screen (400). In a preferred embodiment, a Return icon is included in the menu bar of any display having a menu bar, and serves the purpose of allowing the user to return to the screen last displayed before the screen being viewed when the Return icon is clicked.

The invention thus allows the user rapidly to switch from one tabular display to the next by allowing the user to switch back to a Query dialog box (300) with simple mouse action, change the assigned values and/or the sort order as desired in the Query dialog box (300), then, again with only simple mouse action, view the resulting table.

In another preferred embodiment, the Viewing Query screen includes a "Cycle" icon (424). Clicking repeatedly on the Cycle icon (424) results in the successive display of tables resulting from sorting the selected text data objects according to each sort order possible with the parameters displayed in the Query dialog box (300). The user would thus have the ability to rapidly view a series of differently sorted tables in a manner similar to viewing a series of images on a slide projector. The user preferably would have the ability to save a plurality of sort orders for later selection and use from the Query dialog box.

In another preferred embodiment, the display depicted in FIG. 4 also facilitates the revision of text data objects displayed on the Viewing Query screen (400). This revision process encompasses the Highlight step (214), the Display Edit Dialog Box step (216) and the Edit Data step (218) shown on FIG. 2. To review text data objects in a preferred embodiment, the user highlights a row of the table of text data objects by clicking on that row with the mouse (as illustrated in the first row of text data objects displayed on the Viewing Query screen (400) illustrated in FIG. 4) and then clicks on the "Edit" icon (426) (depicted as a pencil marking a page of text) on the menu bar, which signals the computer system to display the Editing Data dialog box (500) shown in FIG. 5. This Editing Data dialog box (500) preferably displays all the parameters and the values of the parameters for the highlighted text data object (502). The user has the option of changing the value of any parameter for the highlighted text data object by entering a value in the space in the Editing Data dialog box below that parameter. Clicking on a down-arrow icon (504) next to the space below a parameter name signals the computer system to display a pull-down menu listing all possible values for that parameter, which also permits selection of one or more values for that parameter. In addition, in a preferred embodiment, the Editing Data dialog box (500) contains a space for the textual identifier of the text data object (506) (labeled "Action" in FIG. 5) that appears in the table of FIG. 4 (402).

Figure 5:
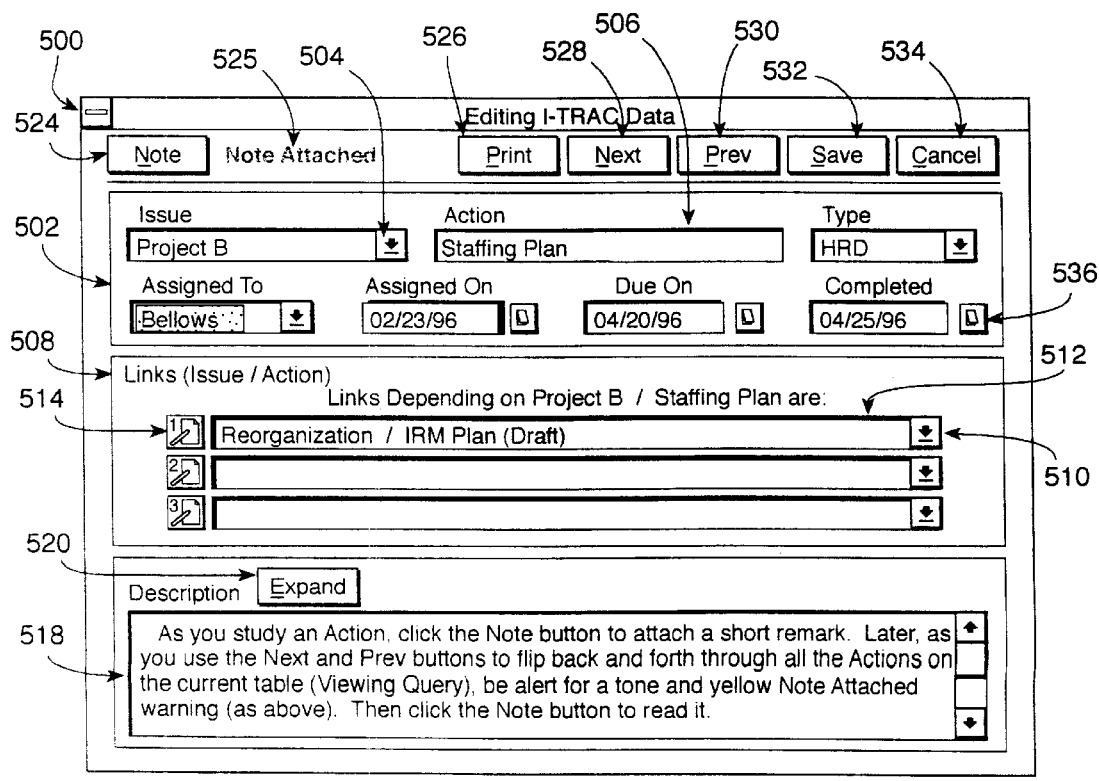
FIG. 5 is an illustration of a display screen showing an exemplary Edit dialog box for revising values of parameters associated with text data objects, links to text data objects depending on the displayed text data object and a textual description of the displayed text data object.

The Editing Data dialog box also contains space for entering "links" (508) identifying other text data objects that depend on the text data object whose parameters and parameter values are displayed in the Editing Data dialog box. In the illustration of FIG. 5, "Reorganization/IRM Plan (Draft)" depends on "Project B/Staffing Plan." In a preferred embodiment, clicking on the down-arrow icon (510) to the right of the space for entering a link (512) signals the computer system to display a pull-down a menu that allows the user to scroll through all text data objects in the database. Clicking on a text data object in this pull-down menu enters that text data object in the space for entering links (512). Clicking on the "View Links" icon (514) to the left of the space for entering the link preferably signals the computer system to display a "Viewing Link" screen (516) depicted in FIG. 5(a), which permits the user to view the same information as found in the Editing Data dialog box (500) for that link.

The Editing Data dialog box (500) preferably also contains a space (518) for entering a multi-line "Description" of the event, object or objective represented by the data row. Clicking the "Expand" box (520) above this space preferably signals the computer system to display an "Editing Expanded Description" screen (522) depicted in FIG. 5(b), which permits the user to view and edit any part of the text of the Description.

In a preferred embodiment, the Editing Data dialog box includes a menu bar comprising boxes containing the words "Note" (524), "Print" (526), "Next" (528), "Prev" (530), "Save" (532), and "Cancel" (534). Clicking on the Note box (524) preferably allows the user to read or edit a brief textual note concerning the displayed text data object. Preferably, if a note exists, the words "Note Attached" (525) appears next to the Note box (524) on the Editing Data dialog box (500). In a preferred embodiment, clicking the Print box (526) allows the user to send the information contained in the Editing Data dialog box to a printer or to a computer file by means well known to users and programmers of Windows™ applications for later viewing, printing, or electronic transmission. Clicking the Next box (528) preferably causes the information contained in the Editing Data dialog box to be saved to a file within the computer system (100) and calls up the Editing Data dialog box for the text data object that would appear in the Viewing Query table immediately below the text data object then being displayed in the Editing Data dialog box. In a preferred embodiment, clicking the Prev box (530) causes the information contained in the Editing Data dialog box to be saved to a file within the computer system (100) and calls up the Editing Data dialog box (500) for the text data object that would appear in the Viewing Query screen (400) immediately above the text data object then being displayed in the Viewing Query screen (400). Clicking the Save box (532) preferably causes the information contained in the Editing Data dialog box (500) to be saved to a file within the computer system (100), and returns the user to the screen he or she was using prior to calling up the Editing Data dialog box (500). In a preferred embodiment, clicking the Cancel box (526) returns the user to the Viewing Query screen (400) without saving any changes that might have been made to the text data object.

In a preferred embodiment, highlighting a row on the Viewing Query screen (400) and then clicking the "Check mark" icon (428) on that screen causes a check mark to appear in the "Select" column (430). Clicking on the "Delete" icon (432) (depicted as a recycling bin in an illustrative embodiment) preferably signals the computer system to delete the selected text data objects. Clicking on the "Print Selected Records" icon (434) (depicted as a printer in an illustrative embodiment) preferably permits the user to print only the selected text data objects. Clicking the "Print Query" icon (436) (depicted as a printed page in an illustrative embodiment) preferably permits the user to print the table displayed on the Viewing Query screen (400).

Figures 5B, 6:
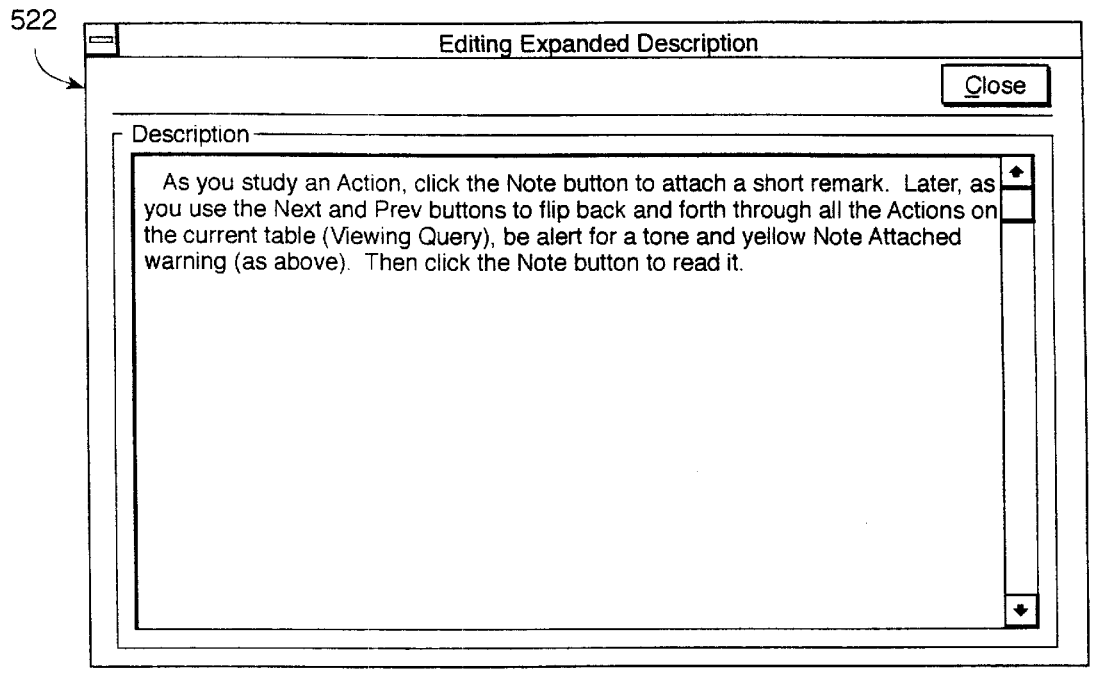
FIG. 5(b) is an illustration of a display screen providing a workspace for viewing and editing an expanded description of a text data object.
FIG. 6 is an illustration of a display screen showing an exemplary Viewing Links table displaying all "linked" text data objects responsive to a query.

Referring again to FIG. 3, in a preferred embodiment clicking the Links box (304) signals the computer system to display a Viewing Query Links screen (600), as illustrated in FIG. 6, preferably including only those text data objects that are both responsive to the constructed query and have other text data objects depending on them. For example, in this illustration, the fact that the Action "Marketing Plan" appears on the exemplary Viewing Query Links screen (600) tells the user that some other Action depends on the Marketing Plan.

In a preferred embodiment, features available on the Viewing Query Links screen (600) are similar to those available on the Viewing Query screen. For example, by highlighting and clicking on the text data object for Marketing Plan displayed on the illustrative Viewing Query Links screen (602), the user could call up the Editing Data dialog box (500) for Marketing Plan, and thereby could (for example) identify the actions that depend on the Marketing Plan, by viewing the Links space (508). Additional features of the Editing Data dialog box (500) are discussed above. In a preferred embodiment, if the Editing Data dialog box (500) is displayed immediately after a Viewing Query Links screen (600), the Next box (528) and the Prev box (532) on the Editing Data dialog box can be used to access Editing Data dialog boxes only for the text data objects displayed in the Viewing Query Links table (600).

Referring again to FIG. 4, three further generic icons are there displayed that, in a preferred embodiment, facilitate operations not specific to the Viewing Query screen (400) and which preferably are also available on other screens in the embodiment. In a preferred embodiment, these generic icons are the "Help" icon (438), (depicted as a question mark), the "Add Data" icon (440) (depicted as an arrow pointing into an open file), and the "Exit" icon (442) (depicted as an arrow pointing to an open door). In a preferred embodiment, clicking on the Help icon (438) signals the computer system to execute a help program, which provides explanations of the operation of the embodiment of the invention on the computer system (100) on which it is implemented. In a preferred embodiment, a Help icon is available on each screen that displays a menu bar. In a preferred embodiment, the help program provides for printing, saving, editing, searching, scrolling, and book marking in a manner well known to users and programmers of Windows™ applications.

In a preferred embodiment, clicking on the Add Data icon (440) signals the computer system (100) to display an Adding Data dialog box (700), as illustrated in FIG. 7, for entering new text data objects into the computer system (100). The Adding Data dialog box (700) preferably can also be accessed through an icon on the menu bar that appears on the screen (800) first displayed when a user first begins each use of a preferred embodiment of the invention. The Adding Data dialog box (700) preferably provides the same spaces and has the same features as the Editing Data dialog box (500), except that the Adding Data dialog box (700) is used for adding new text data objects rather than editing existing text data objects (for this reason, the menu bar of the Adding Data dialog box (700) does not contain "Next" or "Prev" boxes).

In a preferred embodiment, clicking on the Exit icon (442) initiates the process whereby the user signals the computer system on which the embodiment is implemented to stop executing the embodiment. An Exit icon (442) is also available on the menu bar that appears when the user first begins each use of a preferred embodiment of the invention (800), as well as the Viewing Parameters screens depicted in FIGS. 9 and 10.

In another preferred embodiment, the invention comprises a plurality of databases, each containing a plurality of text data objects. In this preferred embodiment, the screen that appears upon starting the program (800) includes in its menu bar an icon representing each different database (802). The exemplary illustration (800) depicts two "Database" icons (804) (each depicted as a hand placing or removing a page of text from a file with an alphabetic abbreviation). The user preferably chooses a database by clicking on its representative icon, and then may practice the present invention on the selected database.

Figure 9:
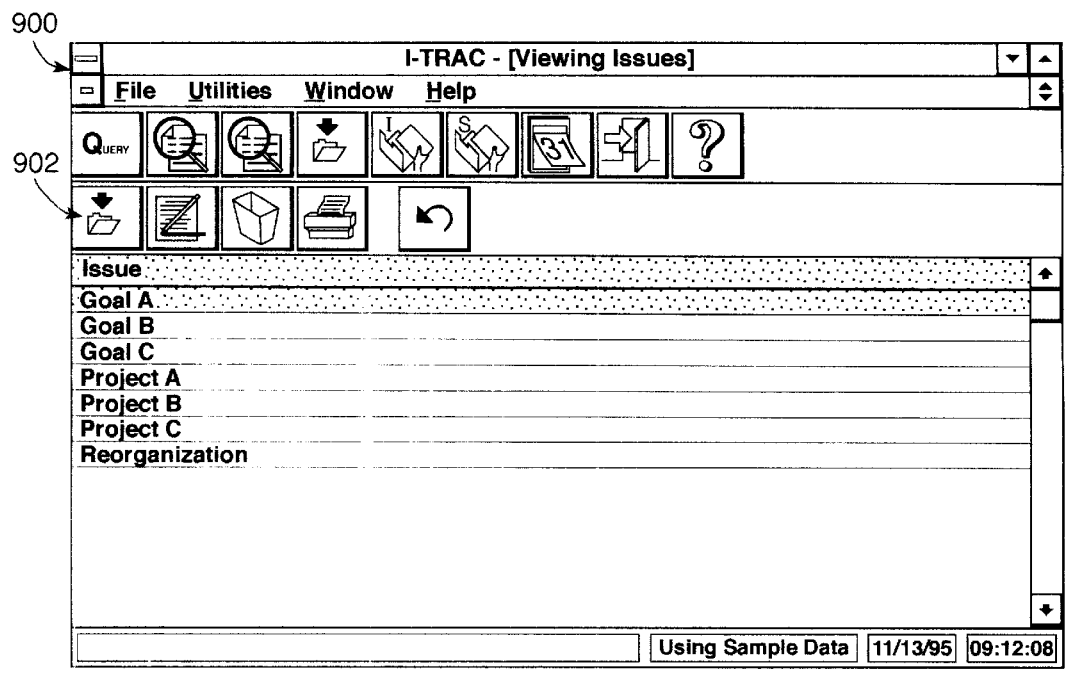
FIG. 9 is an illustration of a display screen showing a Viewing Parameter dialog box for adding, deleting or changing parameter values, where the viewed parameter in the illustration is "Issue."
Figure 10:
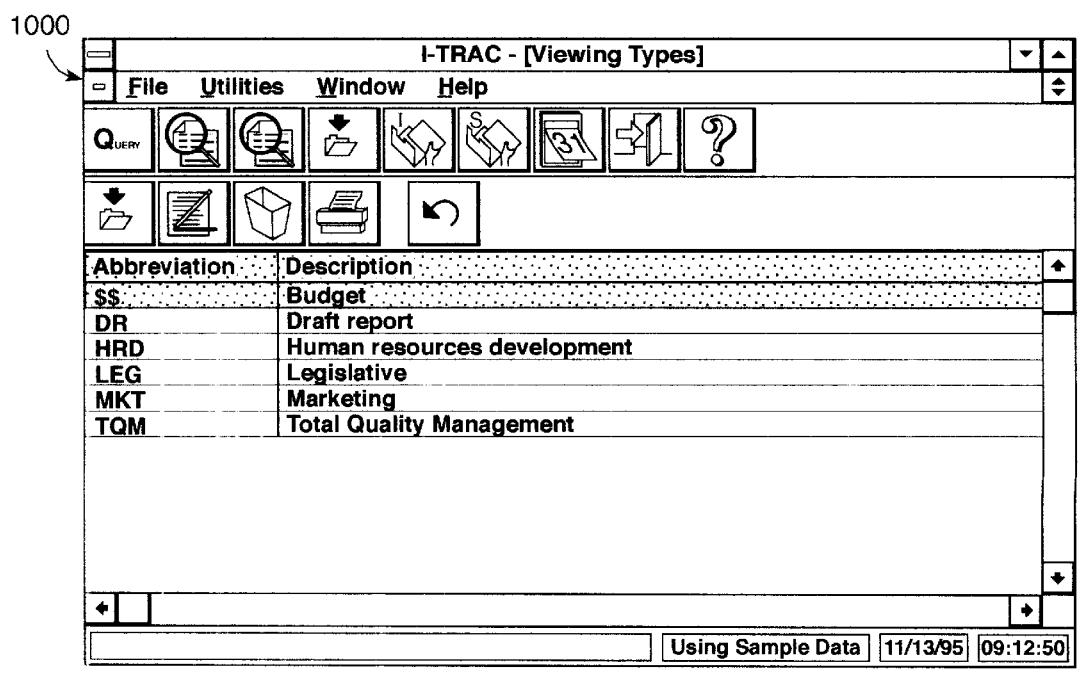
FIG. 10 is an illustration of a display screen showing a Viewing Parameter dialog box for adding, deleting or changing possible parameter values, and for associating an abbreviation with each parameter value where the viewed parameter in the illustration is "Type."

In a preferred embodiment depicted in FIG. 8, the "Choose Parameters" icon (806) is a magnifying glass over a page of text. Clicking on this icon signals the computer system to display the Viewing Parameter dialog box, such as depicted in FIG. 9. FIG. 9 depicts an exemplary Viewing Parameter dialog box (900) for the "Issue" parameter. Clicking on the Add Data icon (902) from the menu bar of a Viewing Parameter dialog box (900) preferably permits the user to add a new value for the "Issue" parameter. FIG. 10 depicts an exemplary Viewing Parameter dialog box (1000) for the "Type" parameter.

Figure 8A:
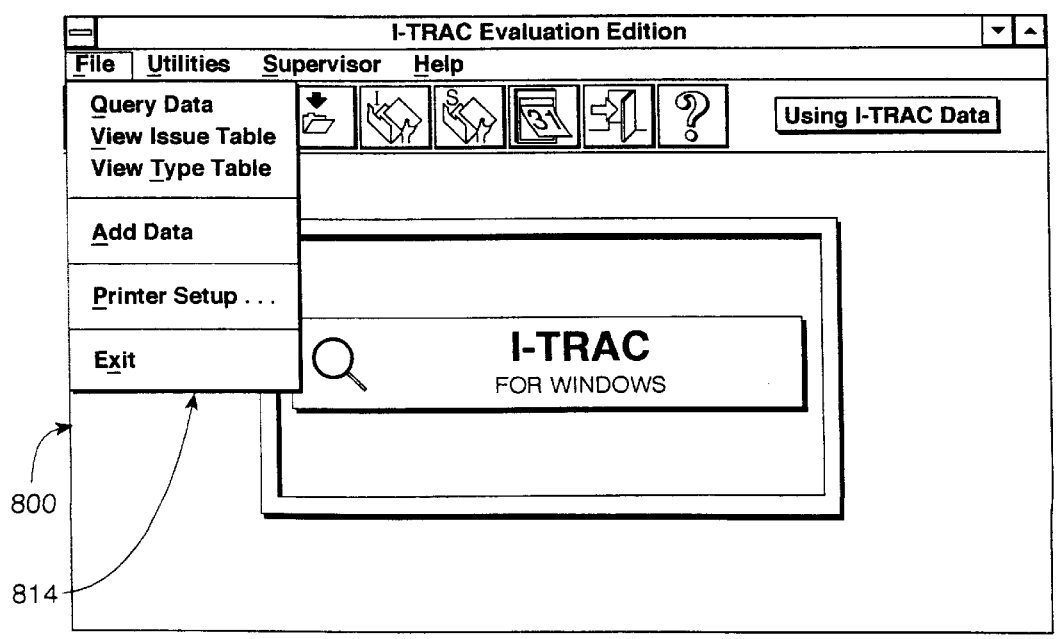
FIG. 8(a) is an illustration of a display screen showing an exemplary pull-down menu for the File function in the screen that appears when a user of an exemplary embodiment of the present invention starts to use a computer system programmed to implement an exemplary embodiment.
Figure 8B:
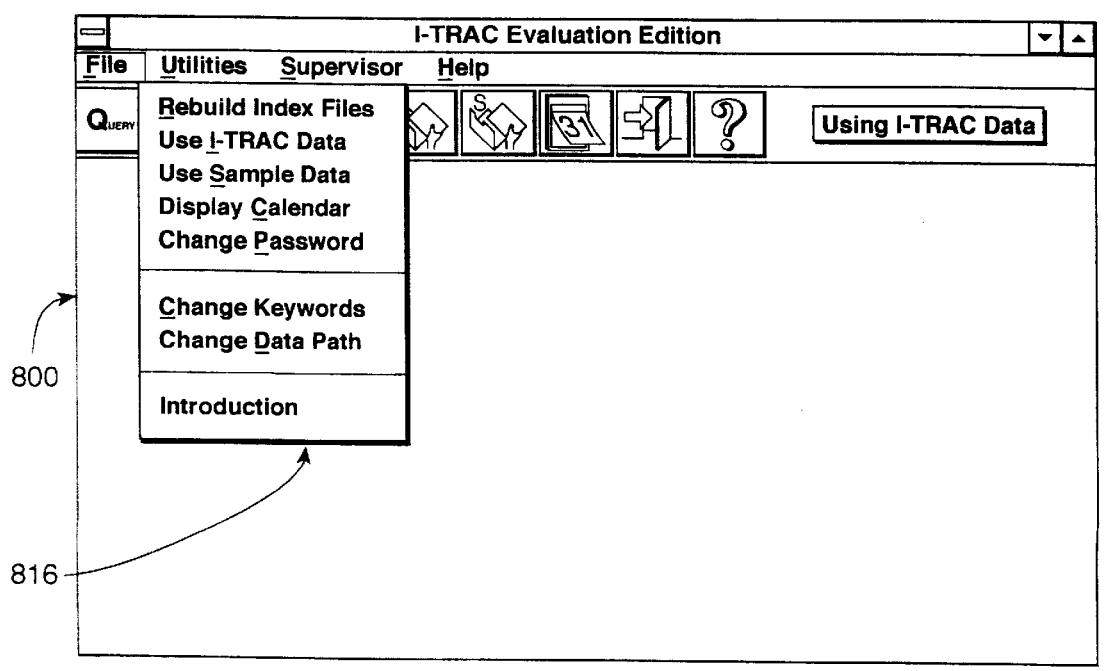
FIG. 8(b) is an illustration of a display screen showing an exemplary pull-down menu for the Utilities function in the screen that appears when a user of an exemplary embodiment of the present invention starts to use a computer system programmed to implement an exemplary embodiment.

In a preferred embodiment, a textual menu bar (808), containing the words "File," "Utilities", "Window" and "Help" is available on the screen that is displayed when a user begins each use of a preferred embodiment of the invention (800), the Viewing Query screen (400), and the Viewing Parameter dialog box (900). In a preferred embodiment, clicking on "File" or pressing the Alt-F on a keyboard communicating with the computer system signals the computer system to display a pull-down menu (814), depicted in FIG. 8(a), from which the user may select from "Query Data," "View Issue Table," "View Type Table," "Add Data," "Printer Setup" or "Exit." In a preferred embodiment, clicking on "Utilities" or pressing Alt-U on a keyboard communicating with the computer system signals the system to display a pull-down menu (816), depicted in FIG. 8(b), from which the user may select from "Display Calendar," "Change Password," "Change Keywords," "Change Data Path," and "Rebuild Index Files." With the exception of Change Keywords, which is unique to this invention, these functions are well known to users and programmers of Windows™ applications. In a preferred embodiment the "Utilities" menu also allows the user to select a database.

Figure 11:
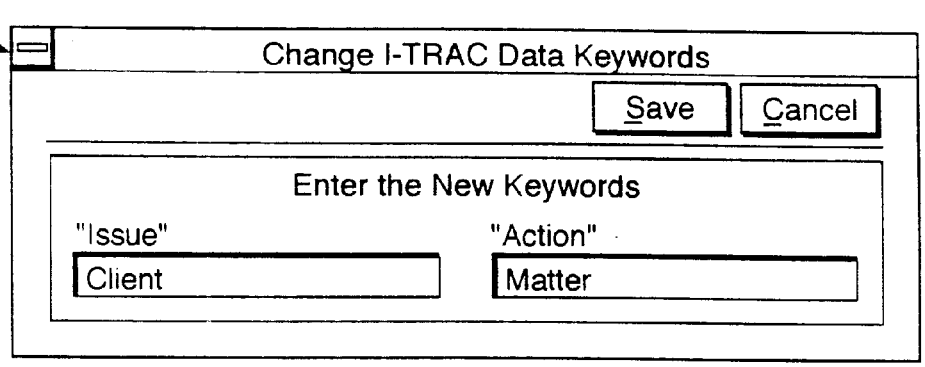
FIG. 11 is an illustration of a display screen showing a Change Keywords dialog box for naming or renaming parameters.

Selecting "Change Keywords" from the Utilities menu preferably causes the computer to display a Change Keywords dialog box as illustrated in FIG. 11. The Change Keywords dialog box (1100) allows the user to assign or change the name of each parameter that will be associated with the text data objects to be sorted according to the invention. The names for the parameters chosen by the user appear in all subsequent screens pertaining to parameters, such as the Query dialog box (300) illustrated in FIG. 3, or the Viewing Query screen (400) illustrated in FIG. 4.

In a preferred embodiment, clicking on "Window" signals the computer system to display a menu of functions that are well known to users and programmers of Windows™ applications. In a preferred embodiment, clicking on "Help" signals the computer system to execute a help program discussed above.

In a preferred embodiment, the screen that appears when the user begins each use of a preferred embodiment (800) also includes a Calendar icon (810) (depicting a page from a calendar). Clicking on the Calendar icon (810) gives the user access to a calendar that preferably spans an entire century. The calendar is preferably also accessible from the Editing Data dialog box (536) and the Add Data dialog box (702), and dates from the calendar can be clicked on in these dialog boxes to assign values to temporal parameters assigned to text data objects.

In a preferred embodiment, placing a cursor on an icon also signals the computer system to display a brief text description of the function to be executed when the icon is clicked. For example, placing a cursor on the Add Data icon (812) on the screen depicted in FIG. 8 causes the text "Add New Information to I-TRAC" to appear at the bottom of the screen.

Figure 12:
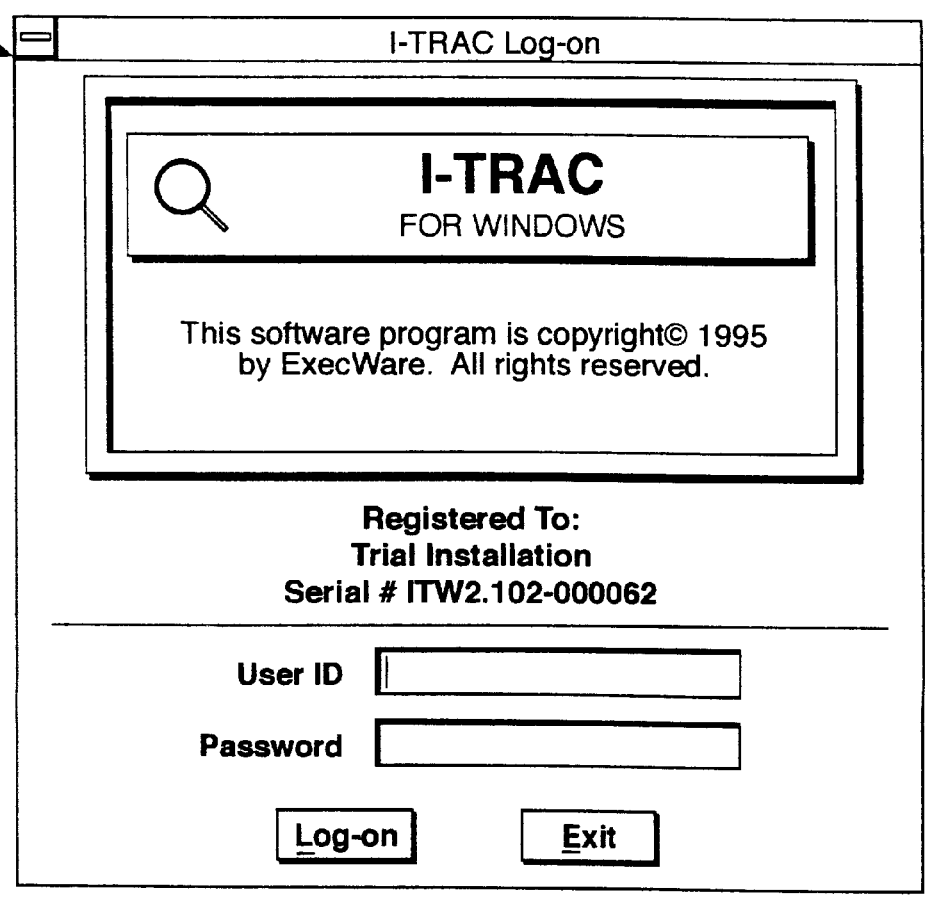
FIG. 12 is an illustration of a display screen that may be used in an exemplary embodiment of the present invention if entry of a user name and password is to be required for access to the computer program.

In a further preferred embodiment, the screen displayed when a user begins a use of the embodiment prompts the user to type in a name and password, as illustrated in FIG. 12. In this embodiment, which may be used when it is desirable to limit access to the invention to authorized personnel, entering an preselected user name and password signals the computer system to display the screen (800) illustrated in FIG. 8, discussed above.

In a further preferred embodiment, the computer system may be signalled to execute selected commands by pressing appropriate keys on a keyboard communicating with the computer system. For example, icons may be highlighted in turn by repeated pressing of the "Tab" key or the "Control" and "Tab" keys on the keyboard simultaneously, and the computer system could be signalled to execute the function represented by the highlighted icon by pressing the "Enter" or "Return" key on the keyboard. Similarly, selected menu bar entries and other command names displayed in text by the computer system may include a letter that is highlighted or underscored. In the case of a command, pressing the key on the keyboard for the underscored or highlighted letter signals the computer system to execute that command. In the case of a menu bar item, pressing signals the computer system to display a pull-down menu with a list of entries and command names corresponding to selected icons. Through the use of well-known techniques, including using keyboard arrow keys to highlight a selected entry or command and pressing the "Enter" key, a user may also signal the computer to execute a selected command or the display a selected entry.

It will be apparent to those skilled in the art that the invention described herein is not limited to the specific preferred embodiments discussed above. For example, although the above discussion describes a program using a mouse device on a Windows™ platform, those skilled in the art will recognize that the invention could also be practiced with input devices such as trackballs, joysticks, light pens, and the like, and could also be usefully implemented on platforms such as Macintosh, X-Windows, Motif, NextStep, OS/2, and the like. It will also be apparent to those skilled in the art that various modifications can be made to this invention of a computer-implemented method for sorting and displaying text data objects without departing from the scope or spirit of the invention. It will be apparent to those skilled in the art that various modifications and variations of the method for sorting and displaying text data objects, provided they come within the scope of the appended claims and their equivalents.

I claim:

1. A method for using a computer system to sort and display text data objects, comprising the steps of:
    a. imaging, on a display device controlled by the computer system, a query dialog box,
        wherein the query dialog box displays each of a plurality of parameters associated with each of the text data objects, forms a plurality of spaces for listing values associated with each displayed parameter, and further forms a space for selecting a sort order;
    b. designating, for each displayed parameter, a parameter value;
    c. constructing a sort order from the displayed parameters in the space for selecting a sort order;
    d. selecting, using the computer system, text data objects satisfying the designated values; and
    e. sorting, using the computer system, the selected text data objects according to the constructed sort order.

2. The method of claim 1 further comprising the step of imaging on the display device controlled by the computer a list of the sorted text data objects.

3. The method of claim 2 further comprising the steps of:
    a. highlighting one of the listed sorted text data objects;
    b. imaging on the display device controlled by the computer an edit dialog box forming spaces for revising data relating to the highlighted text data object; and
    c. revising data relating to the highlighted text data object in the spaces formed by the edit dialog box.

4. The method of claim 2 wherein the step of imaging the list of the sorted text data objects further comprises the step of displaying the names of the parameters as column headings for the text data objects.

5. The method of claim 1 further comprising the steps of:
    a. imaging on the display device controlled by the computer an add dialog box forming spaces for creating a new text data object; and
    b. creating the new text data object in the spaces provided by the add dialog box.

6. The method of claim 1 wherein the plurality of text data objects forms a plurality of databases, wherein the computer system separately sorts each of the plurality of databases, and further comprising the step of associating each of the plurality of text data objects with at least one of the plurality of databases.

7. The method of claim 6 further comprising the steps of:
    a. imaging on the display device controlled by the computer an access dialog box for selecting a database from the plurality of databases; and
    b. selecting a database from the plurality of databases.

8. The method of claim 1 further comprising the steps of:
    a. imaging on the display device controlled by the computer a parameters dialog box for associating a name with each parameter and for associating each parameter with at least one text data object;
    b. associating a name with each parameter; and
    c. associating each parameter with at least one text data object.

9. The method of claim 1 further comprising the step of printing the sorted text data objects.

10. A computer system for sorting and displaying text data objects, comprising:
    a. a display device controlled by the computer;
    b. means for imaging, on the display device controlled by the computer system, a query dialog box,
        wherein the query dialog box displays each of a plurality of parameters associated with each of the text data objects, forms a plurality of spaces for listing values associated with each displayed parameter, and further forms a space for selecting a sort order;
    c. means for designating, for each displayed parameter, a parameter value;
    d. means for constructing a sort order from the displayed list of parameters in the space for selecting a sort order;
    e. means for selecting, using the computer system, text data objects satisfying the designated values; and
    f. means for sorting, using the computer system, the selected text data objects according to the constructed sort order.

11. The apparatus of claim 10 further comprising means for imaging on the display device controlled by the computer a list of the sorted text data objects.

12. The apparatus of claim 11 further comprising:
    a. means for highlighting one of the listed sorted text data objects;
    b. means for imaging on the display device controlled by the computer an edit dialog box forming spaces for revising data relating to the highlighted text data object; and
    c. means for revising data relating to the highlighted text data object in the spaces formed by the edit dialog box.

13. The apparatus of claim 11 wherein the means for imaging the list of the sorted text data objects further comprises means for displaying the names of the parameters as column headings for the text data objects.

14. The apparatus of claim 10 further comprising:
   a. means for imaging on the display device controlled by the computer an add dialog box forming spaces for creating a new text data object; and
   b. means for creating the new text data object in the spaces provided by the add dialog box.

15. The apparatus of claim 10 wherein the plurality of text data objects forms a plurality of databases, and further comprising:
   a. means for using the computer system to separately sort each of the plurality of databases; and
   b. means for associating each of the plurality of text data objects with at least one of the plurality of databases.

16. The apparatus of claim 15 further comprising:
   a. means for imaging on the display device controlled by the computer an access dialog box for selecting a database from the plurality of databases; and
   b. means for selecting a database from the plurality of databases.

17. The apparatus of claim 10 further comprising:
   a. means for imaging on the display device controlled by the computer a parameters dialog box for associating a name with each parameter and for associating each parameter with at least one text data object;
   b. means for associating a name with each parameter; and
   c. means for associating each parameter with at least one text data object.

18. The apparatus of claim 10 further comprising means for printing the sorted text data objects.

19. A computer memory storage device encoded with a computer program for using a computer system to sort and display text data objects comprising:
   a. means for imaging, on a display device controlled by the computer system, a query dialog box,
      wherein the query dialog box displays each of a plurality of parameters associated with each of the text data objects, forms a plurality of spaces for listing values associated with each displayed parameter, and further forms a space for selecting a sort order;
   b. means for designating, for each displayed parameter, a parameter value;
   c. means for constructing a sort order from the displayed parameters in the space for selecting a sort order;
   d. means for selecting, using the computer system, text data objects satisfying the designated values; and
   e. means for sorting, using the computer system, the selected text data objects according to the constructed sort order.

* * * * *